United States Patent
Wilson et al.

(10) Patent No.: US 8,979,353 B2
(45) Date of Patent: Mar. 17, 2015

(54) LIGHT FIXTURE HAVING MODULAR ACCESSORIES AND METHOD OF FORMING SAME

(75) Inventors: Gregg Wilson, Goleta, CA (US); Jason P. Weaver, Goleta, CA (US)

(73) Assignee: Starlights, Inc., Goleta, CA (US)

( * ) Notice: Subject to any disclaimer, the term of this patent is extended or adjusted under 35 U.S.C. 154(b) by 175 days.

(21) Appl. No.: 13/207,971

(22) Filed: Aug. 11, 2011

(65) Prior Publication Data

US 2013/0039055 A1     Feb. 14, 2013

(51) Int. Cl.
| | |
|---|---|
| *H01R 33/00* | (2006.01) |
| *B60Q 3/02* | (2006.01) |
| *F21V 33/00* | (2006.01) |
| *F21S 8/00* | (2006.01) |
| *F21S 8/04* | (2006.01) |
| *F21V 23/04* | (2006.01) |
| *F21Y 101/02* | (2006.01) |

(52) U.S. Cl.
CPC ............ *B60Q 3/0279* (2013.01); *F21V 33/0052* (2013.01); *F21V 33/0076* (2013.01); *F21S 8/03* (2013.01); *F21S 8/04* (2013.01); *F21V 23/0435* (2013.01); *F21V 23/0471* (2013.01); *F21Y 2101/02* (2013.01)
USPC . 362/640; 362/235; 362/217.13; 362/249.01; 362/249.11; 362/490

(58) Field of Classification Search
USPC ............... 362/219, 133, 217.13, 217.17, 800, 362/555, 249.02, 249.01, 249.11, 217.15, 362/225, 270, 640, 490, 74, 80, 234, 253; 315/46, 129–136, 184, 312–313, 317, 315/322, 324; 340/425.5–490, 628, 632, 340/693.5, 693.6, 693.12, 691.1, 815.45, 340/815.49
See application file for complete search history.

(56) References Cited

U.S. PATENT DOCUMENTS

| | | | |
|---|---|---|---|
| 4,291,546 A | | 9/1981 | Rodth |
| 4,419,658 A | * | 12/1983 | Jarosz et al. .................. 340/521 |
| 4,508,163 A | | 4/1985 | McCarthy |
| 4,949,220 A | | 8/1990 | Tashiro |
| 5,154,617 A | * | 10/1992 | Suman et al. ................... 439/34 |
| 5,394,936 A | | 3/1995 | Budelman |
| 5,507,092 A | | 4/1996 | Akachi |
| 6,009,937 A | | 1/2000 | Gonner et al. |
| 6,165,010 A | * | 12/2000 | Prazoff .......................... 439/534 |

(Continued)

FOREIGN PATENT DOCUMENTS

| | | |
|---|---|---|
| DE | 202005016756 | 1/2006 |
| JP | 8312530 A | 11/1996 |

(Continued)

*Primary Examiner* — Anne Hines
*Assistant Examiner* — Jose M Diaz
(74) *Attorney, Agent, or Firm* — Barnes & Thornburg LLP

(57) ABSTRACT

A light fixture (400) includes a housing (401) having a cavity (403) for use with at least one accessory module (415). A light source (411) is integrated in the housing (401) such that the accessory module (415) is modular for allowing functionality of the light to be customized to a specific application. The light fixture (400) is particularly useful in an RV environment where a single light housing is all that is available which must have user selectable functionality in a limited space location. Moreover, the accessory module (415) makes it easy to move functional features from fixture-to-fixture enabling the user to achieve greater utility in many different lighting applications.

25 Claims, 3 Drawing Sheets

(56) References Cited

U.S. PATENT DOCUMENTS

| | | |
|---|---|---|
| 6,398,394 B1* | 6/2002 | Winnik .................... 362/490 |
| 6,542,359 B2 | 4/2003 | Babcock et al. |
| 6,590,770 B1 | 7/2003 | Rogers et al. |
| 6,633,484 B1 | 10/2003 | Lee et al. |
| 6,830,097 B2 | 12/2004 | Wattelet et al. |
| 7,079,972 B1 | 7/2006 | Wood et al. |
| 7,568,817 B2 | 8/2009 | Lee et al. |
| 7,649,472 B1* | 1/2010 | Paterno .................. 340/815.45 |
| 7,740,377 B1* | 6/2010 | Thomas .................. 362/249.17 |
| 7,748,870 B2 | 7/2010 | Chang et al. |
| 7,755,901 B2 | 7/2010 | Shen |
| 2002/0140289 A1* | 10/2002 | McConnell et al. ......... 307/10.1 |
| 2005/0046978 A1* | 3/2005 | Schofield et al. ............. 359/876 |
| 2006/0054210 A1 | 3/2006 | Proisy et al. |
| 2006/0113810 A1* | 6/2006 | Kuhl et al. ................. 296/24.34 |
| 2006/0291224 A1* | 12/2006 | England et al. ............... 362/490 |
| 2007/0001865 A1* | 1/2007 | Rowe ........................... 340/628 |
| 2007/0133219 A1* | 6/2007 | Chaloult et al. .............. 362/490 |
| 2007/0258239 A1* | 11/2007 | Stein et al. .................... 362/227 |
| 2008/0025038 A1 | 1/2008 | Chiang |
| 2008/0247177 A1 | 10/2008 | Tanaka et al. |
| 2009/0067166 A1* | 3/2009 | Ford et al. ..................... 362/208 |
| 2009/0079561 A1* | 3/2009 | Nelson .......................... 340/540 |
| 2009/0251325 A1* | 10/2009 | Smith et al. ................... 340/632 |
| 2010/0124059 A1 | 5/2010 | Duffy et al. |
| 2010/0157581 A1* | 6/2010 | Galli ............................. 362/158 |
| 2010/0296685 A1* | 11/2010 | Carle et al. .................... 381/386 |
| 2012/0127708 A1* | 5/2012 | Chien ........................... 362/234 |
| 2012/0210785 A1* | 8/2012 | Casey ............................ 73/431 |
| 2012/0238319 A1* | 9/2012 | Lake ......................... 455/556.1 |

FOREIGN PATENT DOCUMENTS

| | | |
|---|---|---|
| JP | 2004296212 | 10/2004 |
| WO | 2007002400 | 1/2007 |

* cited by examiner

LIGHT FIXTURE HAVING MODULAR ACCESSORIES AND METHOD OF FORMING SAME

FIELD OF THE INVENTION

The present invention relates generally to light fixtures and more specifically to a light fixture having modular accessories for increasing the fixtures utility.

BACKGROUND

Light fixtures are electrical devices that are used to create artificial light and/or illumination. Most light fixtures come in a variety of sizes and shapes and include some type of electrical light source or lamp. In some instances, a reflector is used for directing the light along with a lens and some type of outer shell or housing that can be used to orient the lamp alignment. Light fixtures come in all types of shapes and sizes depending on their use and application.

Over the past decade, the recreational vehicle (RV) industry has witnessed incredible growth enabling consumers freely travel with as many comforts of home as possible. By their very nature, RVs are frequently parked or moored in remote areas or locations where access to shore power is not conveniently available so leaving a lamp on for convenience or safety is not an option. In the past all that has been available for RV'ing are small lamps affixed in some manner inside the RV, to the underside of the ceiling, underside of the cabinets, walls, or in storage areas mounted either on wall or ceiling of the RV. These types of lights provide only illumination with an on/off switch and no other convenience for comfort or safety. However, no simple, conveniently adaptable lighting systems suitable for uniform wide-area illumination can be found in the market place.

A problem associated with currently available light fixtures is that each type of fixture has no option for increasing its utility. In the prior art lighting fixtures, there are no options available that can be easily added for either single or multiple light fixtures. When the fixture is initially purchased, options cannot be easily added and/or removed as lighting fixtures and their systems are not versatile. In cases where a lighting fixture is required for different lighting applications, finding a light for a specific functional task is often not available in any form. In use specific applications such as recreational vehicles (RV) or trailers, this can be even more problematic in view of the different features that can be required for the light fixture. Consequently, a great deal of additional utility could be provided in a light fixture by allowing its functionality to be easily changed based on customer or user requirements.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
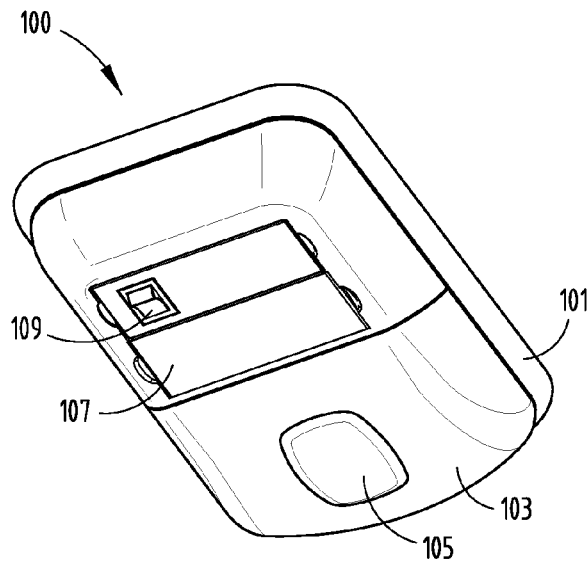
FIG. 1 is a perspective view of a light fixture using modular accessories in accordance with an embodiment of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to a light fixture having modular accessories Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of a light fixture having modular accessories described herein. The non-processor circuits may include, but are not limited to, a radio receiver, a radio transmitter, signal drivers, clock circuits, power source circuits, and user input devices. As such, these functions may be interpreted as steps of a method to provide a light fixture having modular accessories. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

FIG. 1 is a perspective view of a light fixture having modular accessories for use in an RV in accordance with an embodiment of the invention. For the purposes of this invention, RV means any type of recreational vehicle, utility trailer, boat or other large profile vehicles. The light fixture 100 includes a housing 101 that is configured with a substantially flat bottom for attachment and/or mounting to a ceiling, wall or other substantially flat surface. A bezel or lens cover 103 is typically manufactured of a translucent plastic material or the like and is used for covering an internal light source such as a incandescent bulb, light emitting diode (LED) or the like. The light source may run on many differing types of voltage sources, however, a direct current (DC) source between 8-16 VDC is often used in recreational vehicles or other mobile applications. Although shown in FIG. 1 as a single light, it should also be evident to those skilled in the art that two or more lights may be configured similarly in a single housing for providing more light.

Figure 1A:
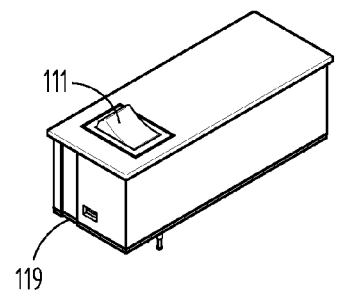
FIG. 1A is a perspective view illustrating a modular accessory having an on/off switch according to an embodiment of the invention.
Figure 1B:
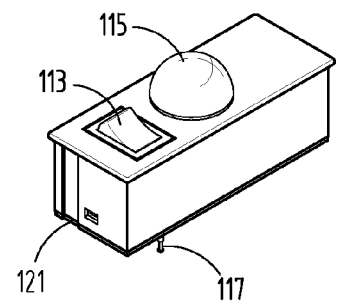
FIG. 1B is a perspective view illustrating a modular accessory having a switch and a passive infrared sensor according to another embodiment of the invention.

In order to customize the light fixture 100 enabling it to provide more functionality to the user, the light includes one or more internal cavities that are configured for adding plug-in type modular accessories. These modular accessories work to add selected features to the light. FIG. 1A is a perspective view illustrating a modular accessory having an on/off switch while FIG. 1B is a perspective view illustrating a modular accessory having a switch and a passive infrared sensor according to another embodiment of the invention. As seen in both FIGS. 1A and 1B, the modular accessories are substantially rectangular in shape and typically have various electronic components mounted therein.

For example, FIG. 1A shows a mechanical rocker switch 111 mounted thereon while FIG. 1B shows both a rocker switch 113 and a passive infrared sensor 115 for detecting motion within a predetermined vicinity of the light and automatically turning the light to an "on" state. Each module includes one or more electrical pins 117 that protrude from the bottom of the modular accessory housing for providing an electrical connection with the light fixture 100. The electrical pins 117 may be "pogo" style pins or the like that provide some resilience when engaging each pin within a corresponding female type connector or flat contact surface within an accessory cavity as described herein. Moreover, both FIGS. 1A and 1B show the housing of the modular accessory having a keyway or keyed slot 119, 121 respectively. As described herein, each keyway 119, 121 corresponds with a key positioned within a cavity located within the lighting fixture housing for enabling the accessory to be inserted in only one way. Since the modular accessory can only be inserted into the light fixture housing 100 in only one way, this prevents the electrical pins 117 from connecting in a manner other than for making a correct electrical connection.

Although FIGS. 1A and 1B may illustrate only two styles of modules, those skilled in the art will recognize that many other modules are within the spirit and scope of various embodiments of the invention. For example, these may include but are not limited to: modules including a dimmer dial, motion detection, photocell sensor, nightlight, light timer and/or motion detector. Also, the module accessories may also be used to provide secondary functionality to the device such as an infrared (IR) of radio frequency (RF) remote lighting control, a surround sound speaker with Bluetooth connection, smoke and/or carbon monoxide detector, video camera, voltmeter, doorbell and/or removable flashlight.

Figure 2:
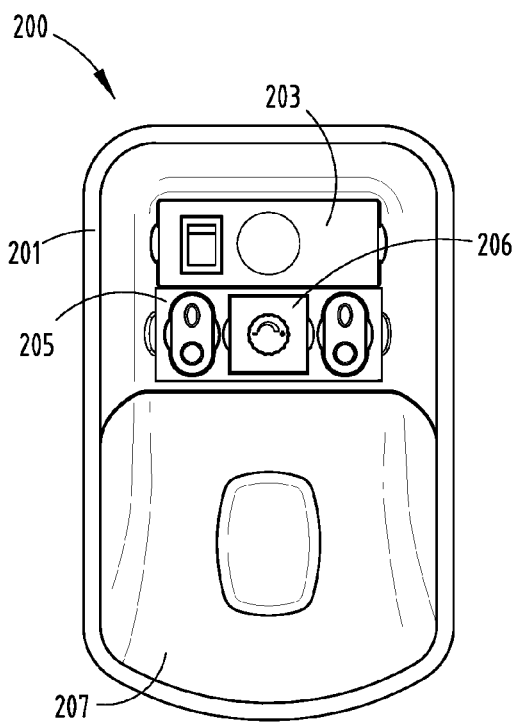
FIG. 2 is a top view of the light fixture using modular accessory in accordance with another embodiment of the invention.
Figure 2A:
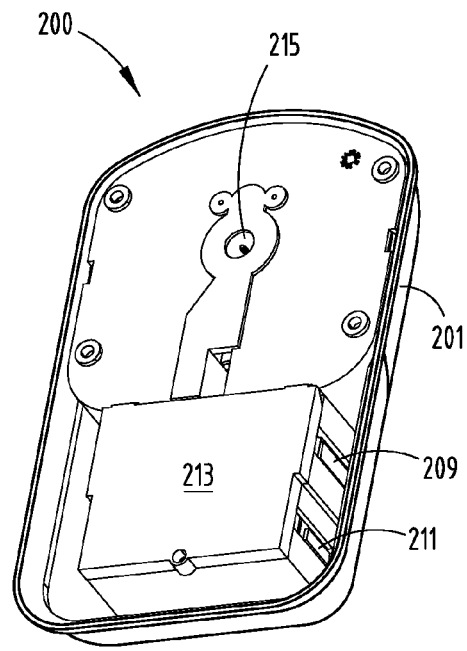
FIG. 2A is a bottom view of the light fixture as shown in FIG. 2.

FIG. 2 is a top view of the light fixture using modular accessory in accordance with another embodiment of the invention. FIG. 2A is a bottom view of the light fixture as shown in FIG. 2. In this embodiment, the light fixture 200 illustrates the use of a uniquely shaped and contoured housing 201 that is configured to use with motion detector module 203 as well as a printed circuit board (PCB) adapter 205 that are plugged into the housing 200 for making electrical contact with control circuitry therein. The PCB adapter 205 allows the user to insert a variety of accessory modules that include but are not limited to a dimmer disk, night light and/or motion sensor into the adapter 205 for use in dimming or lowering the intensity of the light source. As seen in FIG. 2, a motion sensor module 203 and dimmer 206 are inserted into the PCB adapter 205. The dimmer 206 is an electric potentiometer or rheostat used for adjusting the light intensity. The PCB adapter 205 operates to reprogram the functional nature of the light fixture each time a new module is inserted therein. The housing 201 allows for both easy use of an integrated light source 207 but also allows the user to customize the light fixture by inserting and plugging-in modular accessory modules the provide the light fixture with additional operating features and functionality. As seen in FIG. 2A, keys 209, 211 are shown molded or integrated into a modular cavity 213 for enabling the motion detector 203 and PCB adapter 205 to be inserted in only one direction within the cavity 213. The rear surface of the light fixture 200 may include one or more mounting apertures 215 for allowing the light fixture 200 to be mounted to a flat surface.

Figure 3:
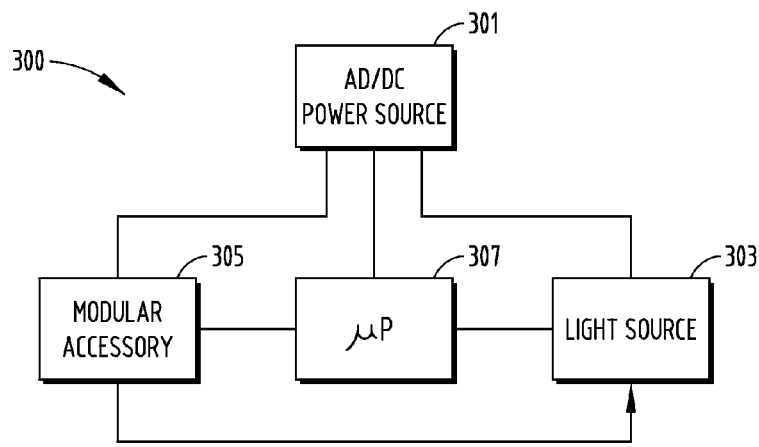
FIG. 3 is a block diagram illustrating the electrical connections of the light source and various modules.

FIG. 3 is a block diagram illustrating the electrical connection of the light source and various modules. The control circuit 300 shows an AC/DC power source 301 connected with at least one light source 303, a modular accessory 305 and a microprocessor or other controller 307. The power source 301 provides a supply voltage (preferably 12 VDC) to the light fixture that supplies the light source(s) 303, the modular accessory 305 and a processor or other control 307 that provides various functionality to the light source. As noted herein, the modular accessory might also provide secondary functionality to other accesses unrelated to operation of the light source 303.

Figure 4:
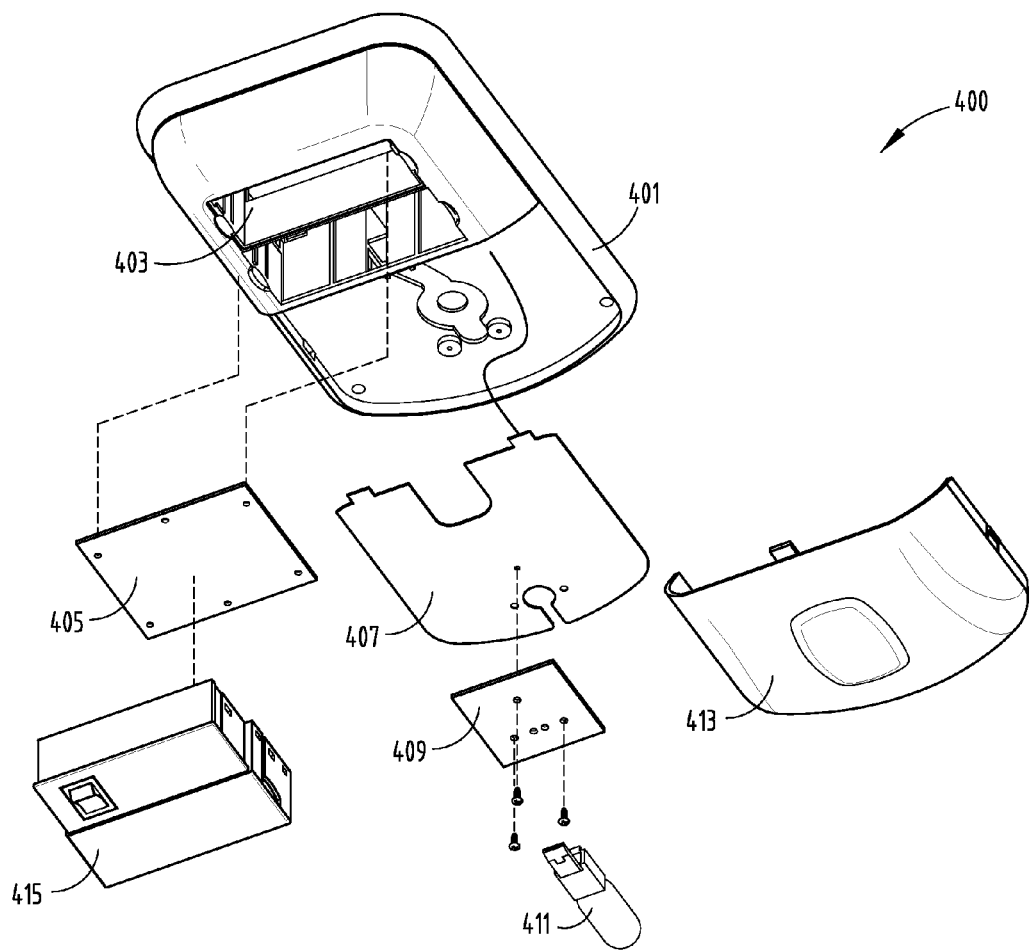
FIG. 4 is an exploded view of the light fixture showing its construction and assembly.

FIG. 4 is an exploded view of the light fixture showing its construction and assembly. The light fixture 400 is illustrated with a housing 401 having one or more accessory cavities 403 that are used to house various accessory modulates. The accessory cavity is molded into the housing 401 such that it includes top walls and side walls for defining a space of predetermined size. The accessory cavity 403 may also include a dividing wall for enabling accessory modules 415 of various sizes to be inserted therein. One or more circuit boards 405 are positioned within the housing 401 for use in making connection with one or more modules 415. The circuit board(s) 405 operate to make electrical connection with electrical pins (not shown) that protrude from the rear of the accessory module 415. The circuit board(s) 405 are typically mounted within the cavities 403 and wired to electrical components such that one of more circuit traces on the circuit board is accessible from within the cavity. The circuit traces face upwardly to the accessory module 415 for allowing connection with electrical pins extending from the bottom of the accessory modules. This allows the accessory module(s) 415 to be easily inserted or removed from the cavity while still enabling the module to achieve a good electrical connection.

A reflector 407 is inserted under the light source 411 and adjacent to the cavities 403. The reflector 407 opiates to reflect both light and heat away from the housing 401 for reducing temperature of the housing when the light is in operation. A mounting plate 409 is attached to the reflector 407 and operates as a mounting surface of the light assembly 411. A clear or opaque lens cover 413 is then used over the light assembly 411 for scattering or diffusing the light emitted therefrom. The lens cover 413 may be configured as a Fresnel lens or otherwise for concentrating light from the light assembly 411. Finally, as noted herein, one or more accessory modules 415 can then be used with the housing 401 for providing additional functionality for the light assembly 411 or other utility of the user of the light The accessory modules may be configured to frictional engage within the cavities 403. Although FIG. 4 illustrates the use of an on/off switch that may use a pogo pin type connection, various others configurations using sockets or wire holders for connecting the switch to the circuit board 405 are also within the scope of the invention.

Figure 5:
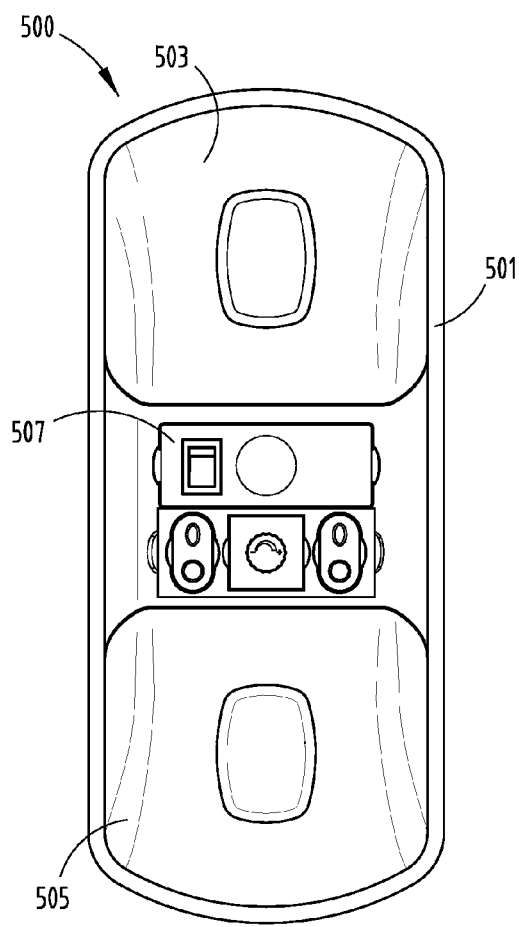
FIG. 5 is a front view showing a light fixture having two light sources according to another embodiment of the invention.
Figure 5A:
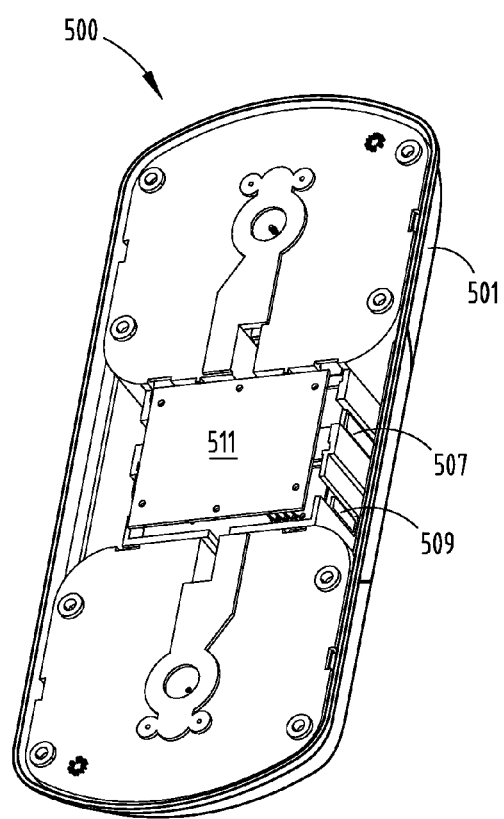
FIG. 5A is a bottom view showing the light fixture shown in FIG. 5.

FIG. 5 is a front view showing a light fixture having two light sources according to another embodiment of the invention. FIG. 5A is a bottom view showing a light fixture shown in FIG. 5. The light fixture 500 includes a housing 501 having to light sources each having a lens cover 503, 505 respectively. One or more accessory modules 507 can be plugged into the housing 501 adding additional functionality to the light sources. FIG. 5A illustrates keys 507, 509 used with a modular cavity 511. As noted herein, the keys 508, 509 permit the accessory modules to be inserted into the light fixture housing 501 in only one way to prevent in improper electrical connection with the circuit board in the cavity 213.

Thus, one or more embodiments of the invention are directed to a light fixture that has modular accessories that can be plugged-in the fixture housing for making electrical connection to a process or other control circuitry. The modular accessories increase the utility of the light by add-on functional capability depending on the requirement of the user and location of the fixture. The light fixture is particularly useful in an RV environment where a single light housing is all that is available which must have user selectable functionality in a limited space location. Moreover, the accessory modules used in the present invention make it easy to move the functionality from fixture-to-fixture until the end user is satisfied with the functionality out come.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A light fixture comprising:
   a housing having a plurality of cavities for use with a respective plurality of interchangeable accessory modules;
   a light emitting diode (LED) light source integrated in the housing;
   a printed circuit board (PCB) adapter which operates to reprogram the functional nature of the light source each time an accessory module is inserted into a cavity of the printed circuit board (PCB) adapter; and
   wherein at least one of the plurality of accessory modules is a light dimmer for allowing the light source to be varied in intensity.

2. A light fixture as in claim 1, wherein at least one of the plurality of accessory modules plugs into at least one of the plurality of cavities.

3. A light fixture as in claim 1, wherein the at least one of the plurality of accessory modules includes at least one electrical connector for connection within the plurality of cavities.

4. A light fixture as in claim 1, wherein at least one of the plurality of accessory modules can also power secondary accessories unrelated to light functionality.

5. A light fixture as in claim 4, wherein the secondary accessories include at least one from the group of carbon monoxide detector, smoke detector, video camera, voltmeter, doorbell, removable flashlight and/or light timer.

6. A light fixture as in claim 1, wherein the housing includes a plurality of keyed passages in the cavity for allowing the at least one accessory module to be inserted in only one direction.

7. A light fixture as in claim 1, wherein the light fixture operates on approximately 12 volts DC.

8. A light fixture as in claim 1, wherein the housing is configured for mounting to a substantially flat surface.

9. A light fixture as in claim 1, wherein the light fixture is used in at least one from the group of recreational vehicle (RV).

10. A light fixture comprising:
    a housing having a plurality of cavities therein;
    a light emitting diode (LED) light source integrated within the housing;
    a plurality of interchangeable accessory modules making an electrical connection within a respective one of the plurality of cavities;
    a printed circuit board (PCB) adapter which operates to reprogram the functional nature of the light source each time an accessory module is inserted into a cavity of the printed circuit board (PCB) adapter; and
    wherein at least one of the plurality of interchangeable accessory modules is a motion detector for allowing the LED light source to be controlled based on proximity detection.

11. A light fixture as in claim 10, wherein at least one accessory module includes a plurality of electrical pins for connection within the at least one cavity.

12. A light fixture as in claim 10, wherein at least one accessory module includes a keyway for allowing the at least one accessory module to be inserted into the at least one cavity on only one direction.

13. A light fixture as in claim 10, wherein the light fixture operates on approximately 12 volts DC.

14. A light fixture as in claim 10, wherein the housing is shaped for mounting to a substantially flat surface.

15. A light fixture as in claim 10, wherein the light fixture is used in a recreational vehicle (RV).

16. A light fixture for use with at least one accessory module comprising:
- at least one light emitting diode (LED) light source mounted within a housing such that the housing includes a plurality of cavities for enabling at least one of a plurality of accessory modules to be interchangeable within a respective one of the plurality of cavities within the housing;
- a printed circuit board (PCB) adapter which operates to reprogram the functional nature of the light source each time an accessory module is inserted into a cavity of the printed circuit board (PCB) adapter; and
- wherein at least one of the plurality of accessory modules is a carbon monoxide detector for allowing carbon monoxide to be detected when in proximity to the housing.

17. A light fixture as in claim 16, wherein the housing includes a plurality of keyed passages that mate with at least one keyway on the at least one accessory module for allow the at least one accessory module to be inserted into the at least one cavity in only one direction.

18. A light fixture as in claim 16, wherein the at least one accessory includes a plurality of electrical contacts.

19. A light fixture as in claim 18, wherein the plurality of contacts are resilient pins.

20. A light fixture as in claim 16, wherein the light fixture operates on approximately 12 volts DC.

21. A light fixture as in claim 16, wherein at least one LED light source includes a lens.

22. A light fixture as in claim 16, wherein the light fixture is used in a recreational vehicle (RV).

23. A light fixture comprising:
- a housing having a plurality of cavities for use with a respective plurality of interchangeable accessory modules;
- a light emitting diode (LED) light source integrated in the housing;
- a printed circuit board (PCB) adapter which operates to reprogram the functional nature of the light source each time an accessory module is inserted into a cavity of the printed circuit board (PCB) adapter; and
- wherein at least one of the plurality of accessory modules is a smoke detector for allowing smoke to be detected when in proximity to the housing.

24. A light fixture comprising:
- a housing having a plurality of cavities for use with a respective plurality of interchangeable accessory modules;
- a light emitting diode (LED) light source integrated in the housing;
- a printed circuit board (PCB) adapter which operates to reprogram the functional nature of the light source each time an accessory module is inserted into a cavity of the printed circuit board (PCB) adapter; and
- wherein at least one of the plurality of accessory modules is a night light for allowing a substantially small amount of light to be shed in darkness without the use of the light source.

25. A light fixture as in claim 24, wherein the night light is controlled with a photo sensor for activating the light under predetermined light conditions.

* * * * *